United States Patent
Onda et al.

(10) Patent No.: US 11,767,424 B2
(45) Date of Patent: Sep. 26, 2023

(54) POLYFUNCTIONAL PHENOLIC RESIN, POLYFUNCTIONAL EPOXY RESIN, CURABLE RESIN COMPOSITION CONTAINING THESE, AND CURED PRODUCT THEREOF

(71) Applicant: DIC Corporation, Tokyo (JP)

(72) Inventors: Shinji Onda, Ichihara (JP); Kunihiro Morinaga, Ichihara (JP)

(73) Assignee: DIC Corporation, Tokyo (JP)

( * ) Notice: Subject to any disclaimer, the term of this patent is extended or adjusted under 35 U.S.C. 154(b) by 0 days.

(21) Appl. No.: 17/767,241

(22) PCT Filed: Oct. 1, 2020

(86) PCT No.: PCT/JP2020/037395
§ 371 (c)(1),
(2) Date: Apr. 7, 2022

(87) PCT Pub. No.: WO2021/079711
PCT Pub. Date: Apr. 29, 2021

(65) Prior Publication Data
US 2022/0403154 A1 Dec. 22, 2022

(30) Foreign Application Priority Data
Oct. 25, 2019 (JP) ................................ 2019-194330

(51) Int. Cl.
| | |
|---|---|
| *C08G 59/32* | (2006.01) |
| *C08L 63/00* | (2006.01) |
| *C08J 5/24* | (2006.01) |
| *B32B 15/092* | (2006.01) |
| *B32B 27/38* | (2006.01) |
| *H01L 23/29* | (2006.01) |
| *C08L 61/12* | (2006.01) |
| *C08G 59/06* | (2006.01) |
| *C08G 59/62* | (2006.01) |

(52) U.S. Cl.
CPC .............. *C08L 61/12* (2013.01); *C08G 59/06* (2013.01); *C08J 5/24* (2013.01); *C08J 2361/12* (2013.01); *C08L 2203/20* (2013.01)

(58) Field of Classification Search
None
See application file for complete search history.

(56) References Cited

U.S. PATENT DOCUMENTS

| | | | | |
|---|---|---|---|---|
| 4,833,164 A | * | 5/1989 | Batt | C07C 43/295 549/497 |
| 5,478,871 A | * | 12/1995 | Takebe | C07D 303/24 264/572 |
| 5,597,876 A | | 1/1997 | Murata et al. | |
| 2003/0075245 A1 | | 4/2003 | Kucera et al. | |
| 2015/0144835 A1 | * | 5/2015 | Kosugi | C08G 8/10 252/73 |
| 2016/0130243 A1 | * | 5/2016 | Satou | C08G 59/3218 523/400 |
| 2018/0051125 A1 | | 2/2018 | Aoki et al. | |
| 2021/0095068 A1 | | 4/2021 | Sugimoto et al. | |

FOREIGN PATENT DOCUMENTS

| | | |
|---|---|---|
| JP | H07-90052 A | 4/1995 |
| JP | 2001-354707 A | 12/2001 |
| JP | 2003-192754 A | 7/2003 |
| JP | 2004-315974 A | 11/2004 |
| JP | 2006-274217 A | 10/2006 |
| JP | 2008-156553 A | 7/2008 |
| JP | 2009-293101 A | 12/2009 |
| WO | 2016/148175 A1 | 9/2016 |
| WO | 2019/013081 A1 | 1/2019 |

* cited by examiner

*Primary Examiner* — Michael J Feely
(74) *Attorney, Agent, or Firm* — Locke Lord LLP; James E. Armstrong, IV; Nicholas J. DiCeglie, Jr.

(57) ABSTRACT

The present invention provides a polyfunctional phenolic resin and a polyfunctional epoxy resin having low viscosity and having excellent mechanical properties and heat resistance of a cured product to be obtained, a curable resin composition containing these, and a cured product thereof. Specifically, provided are a polyfunctional phenolic resin formed with a naphthol structure optionally having a substituent on an aromatic ring and a catechol structure optionally having a methyl group as a substituent on an aromatic ring bonded together via a methylene group optionally having a substituent, a polyfunctional epoxy resin obtained by epoxidizing the polyfunctional phenolic resin, a curable resin composition containing any of these, and a cured product thereof.

17 Claims, 2 Drawing Sheets

POLYFUNCTIONAL PHENOLIC RESIN, POLYFUNCTIONAL EPOXY RESIN, CURABLE RESIN COMPOSITION CONTAINING THESE, AND CURED PRODUCT THEREOF

TECHNICAL FIELD

The present invention relates to a polyfunctional phenolic resin and a polyfunctional epoxy resin that have excellent heat resistance and mechanical strength of a cured product to be obtained and can suitably be used for composite material applications, electric material applications, and the like, a curable resin composition containing these, and a cured product thereof.

BACKGROUND ART

Phenolic resins and epoxy resins are being used for adhesives, molding materials, and materials of paints and the like, and in addition, they are also widely being used in composite material applications such as fiber-reinforced composite materials and electric and electronic fields such as semiconductor sealing materials and insulating materials for printed circuit boards because cured products to be obtained have excellent heat resistance, mechanical strength, moisture resistance, and the like.

In recent years, fiber-reinforced resin molded articles reinforced with reinforcing fibers have been attracting attention for their features such as excellent mechanical strength despite being light in weight and are being increasingly used in various structural applications including chassis and various components for automobiles, aircraft, ships, and the like. The fiber-reinforced resin molded articles can be produced by molding the fiber-reinforced composite materials by methods of molding such as the filament winding method, the press molding method, the hand layup method, the pultrusion method, and the RTM method.

The fiber-reinforced composite materials are made by impregnating resin into reinforcing fibers. Thermosetting resins such as unsaturated polyester resins, vinyl ester resins, and epoxy resins are generally being used for the resins used for the fiber-reinforced composite materials because of the need for stability at room temperature and the durability, strength, and the like of the cured products. Among these, epoxy resins have been put into practical use in various applications as resins for fiber-reinforced composite materials because they have high strength and elastic modulus, and excellent heat resistance.

The epoxy resins for the fiber-reinforced composite materials are required to have low viscosity because the resin is impregnated into the reinforcing fibers as described above. In addition, when the fiber-reinforced resin molded articles are used for structural components around the engine in automobiles and the like or electric wire core materials, a resin with excellent heat resistance and mechanical strength of the cured products is required so that the fiber-reinforced resin molded articles can withstand a harsh operating environment for a long time.

From the viewpoint of a balance between low viscosity and the mechanical strength and the like of the cured products described above, an epoxy resin composition containing an epoxy resin obtained by epoxidizing 1,2,4-trihydroxybenzene is provided, for example (refer to PTL 1, for example). Also known is an epoxy resin composition containing glycidyl ether of a divalent phenol, a tri or higher-functional glycidylamine type epoxy resin, and a curing agent in combination (refer to PTL 2, for example). However, although the epoxy resin compositions provided in PTL 1 and PTL 2 have high impregnability into reinforcing fibers and exhibit a certain level of performance in terms of heat resistance and mechanical strength of the cured products, they do not satisfy required characteristics that have been increasingly growing recently.

CITATION LIST

Patent Literature

PTL 1: WO 2019/013081
PTL 2: WO 2016/148175

SUMMARY OF INVENTION

Technical Problem

Given these circumstances, an object of the present invention is to provide a polyfunctional phenolic resin and a polyfunctional epoxy resin having low viscosity and having excellent mechanical properties and heat resistance of a cured product to be obtained, a curable resin composition containing these, and a cured product thereof.

Solution to Problem

In order to solve the problems, the inventors of the present invention have earnestly studied to find out that using a polyfunctional resin having a naphthol structure and a catechol structure in one molecule increases the heat resistance and the mechanical properties, especially the elastic modulus, of the cured product and to complete the present invention.

Specifically, the present invention provides a polyfunctional phenolic resin formed with a naphthol structure optionally having a substituent on an aromatic ring and a catechol structure optionally having a methyl group as a substituent on an aromatic ring bonded together via a methylene group optionally having a substituent, a curable resin composition containing this, and a cured product thereof.

The present invention further provides a polyfunctional epoxy resin formed with a naphthol structure optionally having a substituent on an aromatic ring and a catechol structure optionally having a methyl group as a substituent on an aromatic ring bonded together via a methylene group optionally having a substituent, a curable resin composition containing this, and a cured product thereof.

Advantageous Effects of Invention

The present invention can provide a polyfunctional phenolic resin and a polyfunctional epoxy resin that have low viscosity, have favorable heat resistance and mechanical properties of a cure product, and can suitably be used for fiber-reinforced composite materials, semiconductor sealing materials, and the like, a curable resin composition containing these, and a cured product thereof.

DESCRIPTION OF EMBODIMENTS

Figure 1:
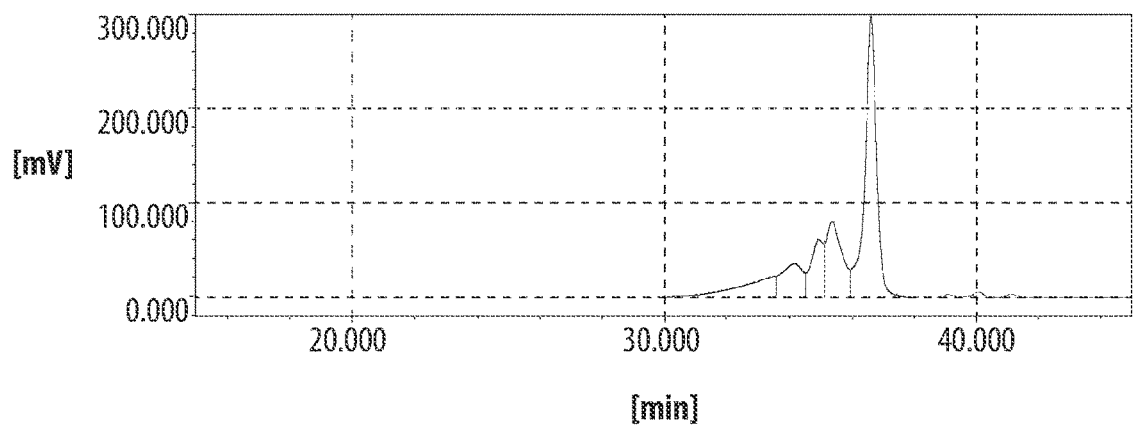
FIG. 1 is a gel permeation chromatography (GPC) chart of a polyfunctional epoxy resin (A-1) obtained in Example 4.

The following describes the present invention in detail.
<Polyfunctional Phenolic Resin>

The polyfunctional phenolic resin of the present invention is formed with a naphthol structure optionally having a substituent on an aromatic ring and a catechol structure optionally having a methyl group as a substituent on an aromatic ring bonded together via a methylene group optionally having a substituent.

It is considered that the polyfunctional phenolic resin has three or more phenolic hydroxy groups in one molecule and also has a benzene ring and a naphthalene ring, and thus cross-linking density of a cured product improves, and in addition, the hydroxy groups on the benzene ring are adjacent to each other to make hydrogen bonding easier to work, and thus the elastic modulus also improves.

Although substituents other than the hydroxy groups may be present on the benzene ring and the naphthalene ring, it is preferable that no substituents are present from the viewpoint of improved cross-linking density and better heat resistance of the cured product. From the viewpoint of ease of obtaining raw materials and reactivity, the linkage between the benzene ring and the naphthalene ring is more preferably a methylene group without substituents.

Examples of the polyfunctional phenolic resin include one represented by Structural Formula (1) below.

[Chemical Formula 1]

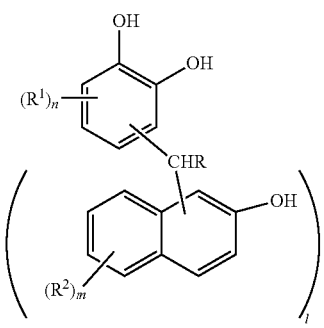

(1)

in Structural Formula (1), R is a hydrogen atom, an alkyl group, or an aryl group; $R^1$ is a hydrogen atom or a methyl group; $R^2$ is a hydrogen atom or an alkyl group; n is an integer of 0 to 3; m is an integer of 0 to 6; l is an integer of 1 to 4; n+1 is 4; and a plurality of $R^1$ and $R^2$ may be the same as or different from each other.

In Formula (1) above, the bonding position between the naphthalene ring and the methylene group optionally having a substituent may be any position, indicating that the methylene group may be bonded either on the ring with the hydroxy group or on the ring without the hydroxy group. If l is 2 or more, they may be the same structure or different structures.

R in Structural Formula (1) above is a hydrogen atom, an alkyl group, or an aryl group; examples of the alkyl group include a methyl group, an ethyl group, a propyl group, a butyl group, a pentyl group, a hexyl group and a cyclohexyl group; and examples of the aryl group include a phenyl group, an alkoxyphenyl group, a tolyl group, a xylyl group, and a naphthyl group. In the method of production described below, from the viewpoint of ease of obtaining raw materials and reactivity, and from the viewpoint of the heat resistance of the cured product to be obtained, R is preferably a hydrogen atom, a methyl group, or an ethyl group and is particularly preferably a hydrogen atom.

$R^1$ in Structural Formula (1) above is a hydrogen atom or a methyl group; from the viewpoint of a balance between the heat resistance and the elastic modulus of the cured product to be obtained, it is preferable that no substituents are present on the benzene ring, and thus $R^1$ is particularly preferably a hydrogen atom.

Furthermore, $R^2$ in Structural Formula (1) above is a hydrogen atom or an alkyl group, and the alkyl group is preferably a $C_{1-6}$ alkyl group; examples thereof include a methyl group, an ethyl group, a propyl group, a butyl group, a pentyl group, and a hexyl group. In the method of production described below, from the viewpoint of ease of obtaining raw materials and reactivity, and from the viewpoint of the balance between the heat resistance and the elastic modulus of the cured product to be obtained, it is preferable that no substituents are present on the naphthalene ring, and thus it is particularly preferable that $R^2$ is a hydrogen atom and m is 6.

The hydroxy group equivalent of the polyfunctional phenolic resin is preferably in the range of 90 to 110 g/eq and is particularly preferably in the range of 90 to 100 g/eq from the viewpoint of superior heat resistance of the cured product to be obtained.

The softening point of the polyfunctional phenolic resin is preferably in the range of 85 to 110° C. and is particularly preferably in the range of 90 to 105° C. from the viewpoint of ease of handling.

Furthermore, the melt viscosity of the polyfunctional phenolic resin at 150° C. is preferably in the range of 1 to 20 dPa·s and is particularly preferably in the range of 1 to 10 dPa·s from the viewpoint of ease of handling.

<Polyfunctional Epoxy Resin>

The polyfunctional epoxy resin of the present invention is a reaction product of a polyfunctional phenolic resin formed with a naphthol structure optionally having a substituent on an aromatic ring and a catechol structure optionally having a methyl group as a substituent on an aromatic ring bonded together via a methylene group optionally having a substituent and epihalohydrin.

The polyfunctional epoxy resin has two or more glycidyl ether groups in one molecule and also has a benzene ring and a naphthalene ring, and thus the cross-linking density of the cured product improves, and in addition, hydroxy groups generated during a curing reaction between the glycidyl ether groups close to each other and a curing agent are also close to each other. Consequently, hydrogen bonding will act more strongly and the elastic modulus of the cured product will improve.

Although substituents other than glycidyl ether groups may be present on the benzene ring and the naphthalene ring, it is preferable that no substituents are present from the viewpoint of improved cross-linking density and better heat resistance of the cured product. From the viewpoint of ease of obtaining raw materials and reactivity, the linkage between the benzene ring and the naphthalene ring is more preferably a methylene group without substituents.

Examples of the polyfunctional epoxy resin include one represented by Structural Formula (2) below.

[Chemical Formula 2]

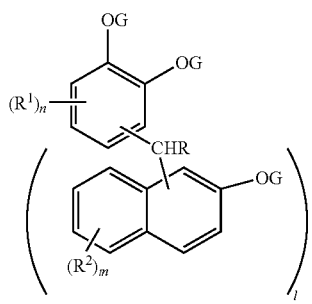

(2)

in Structural Formula (2), G is a glycidyl group; R is a hydrogen atom, an alkyl group, or an aryl group, $R^1$ is a hydrogen atom or a methyl group; $R^2$ is a hydrogen atom or an alkyl group; n is an integer of 0 to 3; m is an integer of 0 to 6; l is an integer of 1 to 4; n+l is 4; and a plurality of $R^1$ and $R^2$ may be the same as or different from each other.

In Formula (1) above, the bonding position between the naphthalene ring and the methylene group optionally having a substituent may be any position, indicating that the methylene group may be bonded either on the ring with the hydroxy group or on the ring without the hydroxy group. If l is 2 or more, they may be the same structure or different structures.

R in Structural Formula (2) above is a hydrogen atom, an alkyl group, or an aryl group; examples of the alkyl group include a methyl group, an ethyl group, a propyl group, a butyl group, a pentyl group, a hexyl group and a cyclohexyl group; and examples of the aryl group include a phenyl group, an alkoxyphenyl group, a tolyl group, a xylyl group, and a naphthyl group. In the method of production described below, from the viewpoint of ease of obtaining raw materials and reactivity, and from the viewpoint of the heat resistance of the cured product to be obtained, R is preferably a hydrogen atom, a methyl group, or an ethyl group and is particularly preferably a hydrogen atom.

$R^1$ in Structural Formula (2) above is a hydrogen atom or a methyl group; from the viewpoint of the balance between the heat resistance and the elastic modulus of the cured product to be obtained, it is preferable that no substituents are present on the benzene ring, and thus $R^1$ is particularly preferably a hydrogen atom.

Furthermore, $R^2$ in Structural Formula (2) above is a hydrogen atom or an alkyl group, and the alkyl group is preferably a $C_{1-6}$ alkyl group; examples thereof include a methyl group, an ethyl group, a propyl group, a butyl group, a pentyl group, and a hexyl group. In the method of production described below, from the viewpoint of ease of obtaining raw materials and reactivity, and from the viewpoint of the balance between the heat resistance and the elastic modulus of the cured product to be obtained, it is preferable that no substituents are present on the naphthalene ring, and thus it is particularly preferable that $R^2$ is a hydrogen atom and m is 6.

The epoxy equivalent of the polyfunctional epoxy resin is preferably in the range of 160 to 210 g/eq and is particularly preferably in the range of 170 to 200 g/eq from the viewpoint of superior heat resistance of the cured product to be obtained.

The melt viscosity of the polyfunctional epoxy resin at 150° C. is preferably in the range of 0.1 to 2 dPa·s and is particularly preferably in the range of 0.1 to 1 dPa·s from the viewpoint of ease of handling.

The polyfunctional epoxy resin of the present invention is made by reacting the polyfunctional phenolic resin as an intermediate and epihalohydrin to glycidyl etherify the hydroxy group; during this reaction, a side reaction occurs and adjacent hydroxy groups in the catechol structure may cyclize. The inclusion of such a by-product may result in a lower viscosity of the epoxy resin after the glycidyl etherification reaction and also contribute to improvement in the elastic modulus of the cured product to be obtained, and thus it is also preferable to make the resin composition with the by-product included.

Examples of the molecular structure obtained by the cyclization include ones represented by the following structural formulae.

[Chemical Formula 3]

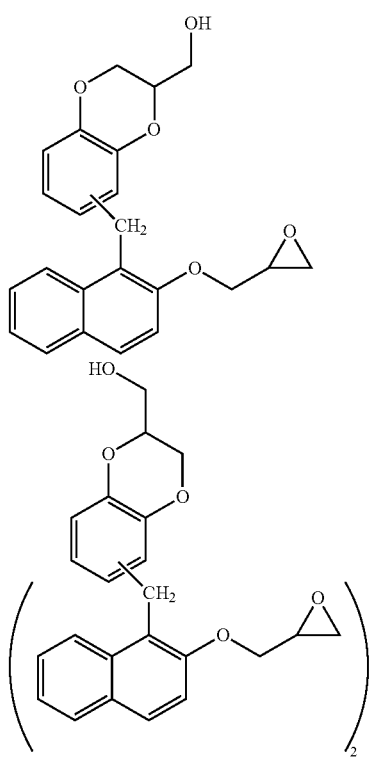

<Method for Producing Polyfunctional Phenolic Resin>

The method for producing the polyfunctional phenolic resin of the present invention is not limited to a particular method; examples thereof include a method of reacting together a naphthol compound, a catechol compound, and an aldehyde compound.

Examples of the naphthol compound include α-naphthol, β-naphthol, and various dihydroxynaphthalenes optionally having a substituent; from the viewpoint of reactivity, it is preferable to use unsubstituted β-naphthol.

Although the catechol compound may have a methyl group, it is preferable to use unsubstituted catechol from the viewpoint of reactivity.

Furthermore, examples of the aldehyde compound include formaldehyde, trioxane, acetaldehyde, propionaldehyde, tetraoxymethylene, polyoxymethylene, chloral, and hexamethylenetetramine. Each of these may be used singly or two or more may be used in combination. Among them, it is preferable to use formaldehyde because of its excellent reactivity. Formaldehyde may be used either as formalin, which is in an aqueous solution form, or be used as paraformaldehyde, which is in a solid form.

As to the use ratio of the raw materials, it is preferable to use the aldehyde compound in the range of 0.80 to 2.00 mole with respect to 1 mole of the naphthol compound, and it is particularly preferable to use the aldehyde compound in the range of 1.00 to 1.50 mole from the viewpoint of controlling molecular weight distribution.

As to the use ratio of the naphthol compound and the catechol compound, it is preferable that they are used in the range of a naphthol compound/the catechol compound=1.0/1.2 to 1.0/5.0 from the viewpoint of controlling molecular weight distribution.

The reaction can be performed under the same conditions as those of normal novolac formation reactions. From the viewpoint of obtaining the desired resin more efficiently, as a solvent, toluene, xylene, methyl isobutyl ketone, isopropyl alcohol, n-butanol, propylene glycol monomethyl ether, ethylene glycol, propylene glycol, diethylene glycol, or the like can be used. It is preferable that the solvent is used in the range of 0.1 to 10 mass times the total use amount of the naphthol compound and the catechol compound as the raw materials.

Furthermore, a catalyst can be used for the reaction. Examples of the catalyst include inorganic acids such as hydrochloric acid, sulfuric acid, and phosphoric acid and organic acids such as oxalic acid, para-toluene sulfonic acid, methanesulfonic acid, and trifluoromethanesulfonic acid. The use amount of the catalyst is preferably in the range of 0.01% by mass to 20% by mass of the total mass of the naphthol compound and the catechol compound.

The reaction temperature is preferably in the range of 120 to 180° C., and it is preferable that the reaction is performed while distilling off water produced in the reaction. The reaction time is usually 2 to 16 hours and is more preferably 3 to 12 hours.

The reaction provides the polyfunctional phenolic resin represented by Structural Formula (1) above, which may contain ones represented by the following structural formulae, for example, as by-products.

[Chemical Formula 4]

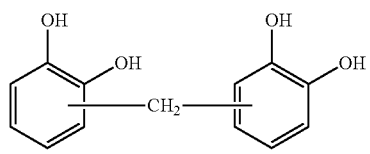

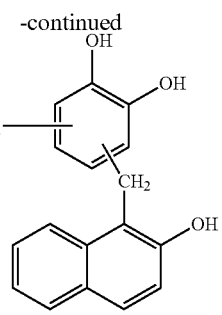

Such by-products may be removed and only the compound represented by Structural Formula (1) above may be taken out and be used, or the compound represented by Structural Formula (1) above can also be used as a curable resin composition described below with the by-products included.

<Method for Producing Polyfunctional Epoxy Resin>

The polyfunctional epoxy resin of the present invention can be obtained by a method of epoxidizing the polyfunctional phenolic resin obtained by the method described above.

Other phenols may be used in combination to the extent that the effects of the invention are not impaired.

The method for producing the polyfunctional epoxy resin of the present invention is a method for producing an epoxy resin of reacting the polyfunctional phenolic resin of the present invention with epihalohydrin to epoxidize the polyfunctional phenolic resin as described above; for the method of epoxidation, known technologies can be used as appropriate.

Examples thereof include a method of adding epihalohydrin in an amount of 1 to 10 mole with respect to 1 mole of the hydroxy groups contained in the polyfunctional phenolic resin, and furthermore, reacting them at a temperature of 20 to 120° C. for 0.5 to 10 hours while adding a basic catalyst in an amount of 0.9 to 2.0 mole with respect to 1 mole of the hydroxy groups of the raw material in bulk or gradually. This basic catalyst may be a solid form, or an aqueous solution thereof may be used; if the aqueous solution is used, it may be added continuously, and water and epihalohydrins may continuously be distilled out of a reaction mixture under reduced pressure or normal pressure and further be separated from each other to remove the water and to continuously return the epihalohydrins to the reaction mixture.

In performing industrial production, all epihalohydrins used for preparation are new in the first batch of epoxy resin production, but from the next batch onward, it is preferable to use epihalohydrins recovered from a crude reaction product together with new epihalohydrins corresponding to the amount that is consumed in the reaction, or the amount that disappears. In this process, impurities such as glycidol induced by the reaction of epichlorohydrin, water, an organic solvent, and the like may be contained. The epihalohydrin used in this process is not limited to a particular epihalohydrin; examples thereof include epichlorohydrin, epibromohydrin, and β-methyl epichlorohydrin. Among these, epichlorohydrin is preferred due to its easy industrial availability.

Specific examples of the basic catalyst include alkaline earth metal hydroxides, alkali metal carbonates, and alkali metal hydroxides. Alkali metal hydroxides are particularly preferred due to their superior catalytic activity in an epoxy resin synthesis reaction; examples thereof include sodium hydroxide and potassium hydroxide. When used, these basic catalysts may be used in an aqueous solution form of about 10% by mass to 55% by mass or be used in a solid form. In addition, the reaction rate in the synthesis of the epoxy resin can be increased by using an organic solvent in combination. Such an organic solvent is not limited to a particular organic solvent; examples thereof include ketones such as acetone and methyl ethyl ketone; alcohols such as methanol, ethanol, 1-propyl alcohol, isopropyl alcohol, 1-butanol, secondary ethanol, and tertiary ethanol; cellosolves such as methyl cellosolve and ethyl cellosolve; ethers such as tetrahydrofuran, 1,4-dioxane, 1,3-dioxane, and diethoxyethane; and non-protic polar solvents such as acetonitrile, dimethyl sulfoxide, and dimethylformamide. Each of these organic solvents may be used singly or two or more may be used in combination as appropriate in order to adjust the polarity.

Subsequently, a reaction product of the epoxidation reaction described above is washed with water, and then unreacted epihalohydrin and the organic solvent used in combination are distilled off by distillation under heating and reduced pressure. To make the epoxy resin with further reduced hydrolytic halogen content, the obtained epoxy resin can be dissolved again in an organic solvent such as toluene, methyl isobutyl ketone, or methyl ethyl ketone, and an aqueous solution of an alkali metal hydroxide such as sodium hydroxide or potassium hydroxide can be added for further reaction. In this process, a phase transfer catalyst such as quaternary ammonium salts and crown ethers may be made present to improve the reaction rate. When the phase transfer catalyst is used, the use amount thereof is preferably in the range of 0.1% by mass to 3.0% by mass with respect to the used epoxy resin. After completion of the reaction, the generated salt is removed by filtration, washing with water, or the like, and further, the solvent such as toluene or methyl isobutyl ketone is distilled off under heating and reduced pressure to obtain a high-purity epoxy resin.

<Curable Resin Composition Containing Polyfunctional Phenolic Resin>

The polyfunctional phenolic resin of the present invention can be made into the curable resin composition by using another compound having a functional group reacting with hydroxy groups, that is, a curing agent (X) in combination. The curable resin composition can suitably be used for various electric and electronic component applications such as adhesives, paints, photoresists, printed circuit boards, and semiconductor sealing materials.

Examples of the curing agent (X) include melamine compounds substituted with at least one group selected from a methylol group, an alkoxymethyl group, and an acyloxymethyl group, guanamine compounds, glycoluril compounds, urea compounds, resol resins, epoxy resins, isocyanate compounds, azide compounds, compounds containing double bonds such as an alkenyl ether group, acid anhydrides, and oxazoline compounds.

Examples of the melamine compounds include hexamethylol melamine, hexamethoxymethyl melamine, compounds in which one to six methylol groups of hexamethylol melamine are methoxymethylated, hexamethoxyethyl melamine, hexaacyloxymethyl melamine, and compounds in which one to six methylol groups of hexamethylol melamine are acyloxymethylated.

Examples of the guanamine compounds include tetramethylol guanamine, tetramethoxymethyl guanamine, tetramethoxyethyl benzoguanamine, compounds in which one to four methylol groups of tetramethylol guanamine are methoxymethylated, tetramethoxyethyl guanamine, tetraacyloxy guanamine, compounds in which one to four methylol groups of tetramethylol guanamine are acyloxymethylated.

Examples of the glycoluril compounds include 1,3,4,6-tetrakis(methoxymethyl)glycoluril, 1,3,4,6-tetrakis(butoxymethyl)glycoluril, and 1,3,4,6-tetrakis(hydroxymethyl) glycoluril.

Examples of the urea compounds include 1,3-bis(hydroxymethyl)urea, 1,1,3,3-tetrakis(butoxymethyl)urea, and 1,1,3,3-tetrakis(methoxymethyl)urea.

Examples of the resol resins include polymers obtained by reacting a phenolic hydroxy group-containing compound such as phenol, alkylphenols such as cresol and xylenol, phenylphenol, resorcinol, biphenyl, bisphenols such as bisphenol A and bisphenol F, naphthol, or dihydroxynaphthalene and an aldehyde compound under an alkaline catalytic condition.

Examples of the epoxy resins include bisphenol A type epoxy resins, bisphenol F type epoxy resins, biphenyl type epoxy resins, tetramethylbiphenyl type epoxy resins, polyhydroxynaphthalene type epoxy resins, phenol novolac type epoxy resins, cresol novolac type epoxy resins, triphenylmethane type epoxy resins, tetraphenylethane type epoxy resins, dicyclopentadiene-phenol addition reaction type epoxy resins, phenol aralkyl type epoxy resins, naphthol novolac type epoxy resins, diglycidyl oxynaphthalene, naphthol aralkyl type epoxy resins, naphthol-phenol co-condensed novolac type epoxy resins, naphthol-cresol co-condensed novolac type epoxy resins, aromatic hydrocarbon formaldehyde resin-modified phenolic resin type epoxy resins, biphenyl-modified novolac type epoxy resins, 1,1-bis (2,7-diglycidyloxy-1-naphthyl)alkanes, naphthylene ether type epoxy resins, triphenylmethane type epoxy resins, phosphorus atom-containing epoxy resins, polyglycidyl ethers of co-condensation products of phenolic hydroxy group-containing compounds and alkoxy group-containing aromatic compounds, and the polyfunctional epoxy resin of the present invention. Among these epoxy resins, it is preferable to use tetramethyl biphenol type epoxy resins, biphenyl aralkyl type epoxy resins, polyhydroxynaphthalene type epoxy resins, and novolac type epoxy resins in terms of obtaining the cured product with excellent fire retardance in particular, and dicyclopentadiene-phenol addition reaction type epoxy resins are preferred in terms of obtaining the cured product with excellent dielectric properties.

Examples of the isocyanate compounds include tolylene diisocyanate, diphenylmethane diisocyanate, hexamethylene diisocyanate, and cyclohexane diisocyanate.

Examples of the azide compounds include 1,1'-biphenyl-4,4'-bisazide, 4,4'-methylidene bisazide, and 4,4'-oxybisazide.

Examples of the compounds containing double bonds such as an alkenyl ether group include ethylene glycol divinyl ether, triethylene glycol divinyl ether, 1,2-propanediol divinyl ether, 1,4-butanediol divinyl ether, tetramethylene glycol divinyl ether, neopentyl glycol divinyl ether, trimethylolpropane trivinyl ether, hexanediol divinyl ether, 1,4-cyclohexanediol divinyl ether, pentaerythritol trivinyl ether, pentaerythritol tetravinyl ether, sorbitol tetravinyl ether, sorbitol pentavinyl ether, and trimethylolpropane trivinyl ether.

Examples of the acid anhydrides include aromatic acid anhydrides such as phthalic anhydride, trimellitic anhydride, pyromellitic anhydride, 3,3',4,4'-benzophenone tetracarboxylic dianhydride, biphenyl tetracarboxylic dianhydride, 4,4'-(isopropylidene)diphthalic anhydride, 4,4'-(hexafluoroisopropylidene)diphthalic anhydride; and alicyclic carboxylic anhydrides such as tetrahydrophthalic anhydride, methyltetrahydrophthalic anhydride, hexahydrophthalic anhydride, methylhexahydrophthalic anhydride, endomethylenetetrahydrophthalic anhydride, dodecenylsuccinic anhydride, and trialkyltetrahydrophthalic anhydrides.

Among these, epoxy resins are particularly preferred because they provide the curable resin composition with excellent curability and heat resistance of the cured product.

Furthermore, when the epoxy resins are used, a curing agent for epoxy resins may be blended.

Examples of the curing agent for epoxy resins that can be used here include various known curing agents for epoxy resins such as amine-based compounds, amide-based compounds, acid anhydride-based compounds, and phenolic compounds.

Specific examples of the amine-based compounds include diaminodiphenylmethane, diethylenetriamine, triethylenetramine, diaminodiphenyl sulfone, isophoronediamine, imidazole, $BF_3$-amine complexes, guanidine derivatives; and examples of the amide-based compounds include dicyandiamide and polyamide resins synthesized from a dimer of linolenic acid and ethylenediamine. Examples of the acid anhydride-based compounds include phthalic anhydride, trimellitic anhydride, pyromellitic anhydride, maleic anhydride, tetrahydrophthalic anhydride, methyltetrahydrophthalic anhydride, methylnagic anhydride, hexahydrophthalic anhydride, and methylhexahydrophthalic anhydride. Examples of the phenolic compounds include phenol novolac resins, cresol novolac resins, aromatic hydrocarbon formaldehyde resin-modified phenolic resins, dicyclopentadiene-phenol addition type resins, phenol aralkyl resins (Zylock resin), naphthol aralkyl resins, triphenylolmethane resins, tetraphenylolethane resins, naphthol novolac resins, naphthol-phenol co-condensed novolac resins, naphthol-cresol co-condensed novolac resins, biphenyl-modified phenolic resins (polyvalent phenolic hydroxy group-containing compounds with the phenolic nuclei linked by bismethylene groups), biphenyl-modified naphthol resins (polyvalent naphthol compounds with the phenolic nuclei linked by bismethylene groups), aminotriazine-modified phenolic resins (polyvalent phenolic hydroxy group-containing compounds with the phenolic nuclei linked by melamine, benzoguanamine, or the like), and polyvalent phenolic hydroxy group-containing compounds such as alkoxy group-containing aromatic ring-modified novolac resins (polyvalent phenolic hydroxy group-containing compounds in which the phenolic nucleus and the alkoxy group-containing aromatic ring are linked by formaldehyde).

<Curable Resin Composition Containing Polyfunctional Epoxy Resin>

The polyfunctional epoxy resin of the present invention can be made into a curable resin composition by using a curing agent (Y) in various types having a group having reactivity with an epoxy group in combination. The curable resin composition can suitably be used for various applications such as adhesives, paints, composite materials, photoresists, printed circuit boards, and semiconductor sealing materials.

Examples of the curing agent (Y) that can be used here include various known curing agents for epoxy resins such as amine-based compounds, amide-based compounds, acid anhydride-based compounds, and phenolic compounds.

Specific examples of the amine-based compounds include diaminodiphenylmethane, diethylenetriamine, triethylenetramine, diaminodiphenyl sulfone, isophoronediamine, imidazole, $BF_3$-amine complexes, guanidine derivatives; and examples of the amide-based compounds include dicyandiamide and polyamide resins synthesized from a dimer of linolenic acid and ethylenediamine. Examples of the acid anhydride-based compounds include phthalic anhydride, trimellitic anhydride, pyromellitic anhydride, maleic anhydride, tetrahydrophthalic anhydride, methyltetrahydrophthalic anhydride, methylnagic anhydride, hexahydrophthalic anhydride, and methylhexahydrophthalic anhydride. Examples of the phenolic compounds include phenol novolac resins, cresol novolac resins, aromatic hydrocarbon formaldehyde resin-modified phenolic resins, dicyclopentadiene-phenol addition type resins, phenol aralkyl resins (Zylock resin), naphthol aralkyl resins, triphenylolmethane resins, tetraphenylolethane resins, naphthol novolac resins, naphthol-phenol co-condensed novolac resins, naphthol-cresol co-condensed novolac resins, biphenyl-modified phenolic resins (polyvalent phenolic hydroxy group-containing compounds with the phenolic nuclei linked by bismethylene groups), biphenyl-modified naphthol resins (polyvalent naphthol compounds with the phenolic nuclei linked by bismethylene groups), aminotriazine-modified phenolic resins (polyvalent phenolic hydroxy group-containing compounds with the phenolic nuclei linked by melamine, benzoguanamine, or the like), and polyvalent phenolic hydroxy group-containing compounds such as alkoxy group-containing aromatic ring-modified novolac resins (polyvalent phenolic hydroxy group-containing compounds in which the phenolic nucleus and the alkoxy group-containing aromatic ring are linked by formaldehyde). Furthermore, the polyfunctional phenolic resin of the present invention may be used.

Furthermore, other epoxy resins other than the epoxy resins specified above can be used in combination with the curable resin composition of the present invention to the extent that the effects of the present invention are not impaired.

Examples of the other epoxy resins include bisphenol A type epoxy resins, bisphenol F type epoxy resins, biphenyl type epoxy resins, tetramethylbiphenyl type epoxy resins, polyhydroxynaphthalene type epoxy resins, phenol novolac type epoxy resins, cresol novolac type epoxy resins, triphenylmethane type epoxy resins, tetraphenylethane type epoxy resins, dicyclopentadiene-phenol addition reaction type epoxy resins, phenol aralkyl type epoxy resins, naphthol novolac type epoxy resins, naphthol aralkyl type epoxy resins, naphthol-phenol co-condensed novolac type epoxy resins, naphthol-cresol co-condensed novolac type epoxy resins, aromatic hydrocarbon formaldehyde resin-modified phenolic resin type epoxy resins, and biphenyl-modified novolac type epoxy resins. Among these epoxy resins, it is preferable to use tetramethyl biphenol type epoxy resins, biphenyl aralkyl type epoxy resins, polyhydroxynaphthalene type epoxy resins, and novolac type epoxy resins in terms of obtaining the cured product with excellent fire retardance in particular, and dicyclopentadiene-phenol addition reaction type epoxy resins are preferred in terms of obtaining the cured product with excellent dielectric properties. When the other epoxy resins are used in combination, it is preferable to contain the epoxy resin of the present invention in an amount of 30 to 90 parts by mass with respect to 100 parts by mass of the total of the epoxy resin of the present invention and the other epoxy resins from the viewpoint that the effect of the present invention can easily be expressed.

In the curable resin composition of the present invention, the blending amounts of the epoxy resin and the curing agent (Y) are preferably in a ratio of 0.8 to 1.2 equivalents of the total of active groups in the curing agent (Y) with respect to 1 equivalent of the total of epoxy groups in the epoxy resin and the other epoxy resins used in combination as needed from the viewpoint of excellent curability.

<Other Components>

In the present invention, other thermosetting resins may be used in combination in either the curable resin composition containing the phenolic resin or the curable resin composition containing the epoxy resin.

Examples of the other thermosetting resins include cyanate ester resins, resins having a benzoxazine structure, maleimide compounds, active ester resins, vinyl benzyl compounds, acrylic compounds, and copolymers of styrene and maleic anhydride. When the other thermosetting resins described above are used in combination, the use amount thereof, which is not limited to a particular amount so long as it does not hinder the effects of the present invention, is preferably in the range of 1 to 50 parts by mass in 100 parts by mass of the curable resin composition.

Examples of the cyanate ester resins include bisphenol A type cyanate ester resins, bisphenol F type cyanate ester resins, bisphenol E type cyanate ester resins, bisphenol S type cyanate ester resins, bisphenol sulfide type cyanate ester resins, phenylene ether type cyanate ester resins, naphthylene ether type cyanate ester resins, biphenyl type cyanate ester resins, tetramethylbiphenyl type cyanate ester resins, polyhydroxynaphthalene type cyanate ester resins, phenol novolac type cyanate ester resins, cresol novolac type cyanate ester resins, triphenylmethane type cyanate ester resins, tetraphenylethane type cyanate ester resins, dicyclopentadiene-phenol addition reaction type cyanate ester resins, phenol aralkyl type cyanate ester resins, naphthol novolac type cyanate ester resins, naphthol aralkyl type cyanate ester resins, naphthol-phenol co-condensed novolac type cyanate ester resins, naphthol-cresol co-condensed novolac type cyanate ester resins, aromatic hydrocarbon formaldehyde resin-modified phenolic resin type cyanate ester resins, biphenyl-modified novolac type cyanate ester resins, and anthracene type cyanate ester resins. Each of these may be used singly or two or more may be used in combination.

Among these cyanate ester resins, it is preferable to use bisphenol A type cyanate ester resin, bisphenol F type cyanate ester resin, bisphenol E type cyanate ester resin, polyhydroxynaphthalene type cyanate ester resin, naphthylene ether type cyanate ester resin, and novolac type cyanate ester resin in terms of obtaining the cured product with excellent heat resistance in particular, and dicyclopentadiene-phenol addition reaction type cyanate ester resins are preferred in terms of obtaining the cured product with excellent dielectric properties.

The resins having a benzoxazine structure are not limited to particular resins; examples thereof include a reaction product of bisphenol F, formalin, and aniline (F-a type benzoxazine resin), a reaction production of diaminodiphenylmethane, formalin, and phenol (P-d type benzoxazine resin), a reaction product of bisphenol A, formalin, and aniline, a reaction product of dihydroxydiphenyl ether, formalin, and aniline, a reaction product of diaminodiphenyl ether, formalin, and phenol, a reaction product of dicyclopentadiene-phenol addition type resins, formalin, and aniline, a reaction product of phenolphthalein, formalin, and aniline, and a reaction product of diphenyl sulfide, formalin, and aniline. Each of these may be used singly or two or more may be used in combination.

Examples of the maleimide compounds include various compounds represented by any of Structural Formulae (i) to (iii) below.

[Chemical Formula 5]

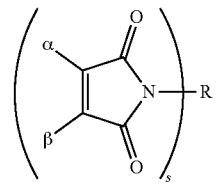

(i)

in the formula, R is an m-valent organic group, $\alpha$ and $\beta$, are each any of a hydrogen atom, a halogen atom, an alkyl group, and an aryl group; and s is an integer of 1 or more.

[Chemical Formula 6]

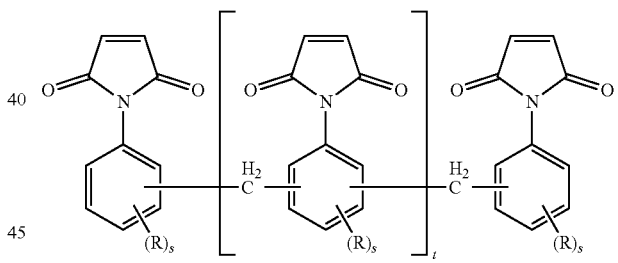

(ii)

in the formula, R is any of a hydrogen atom, an alkyl group, an aryl group, an aralkyl group, a halogen atom, a hydroxy group, and an alkoxy group; s is an integer of 1 to 3, and t is an average of the repeating unit and is 0 to 10.

[Chemical Formula 7]

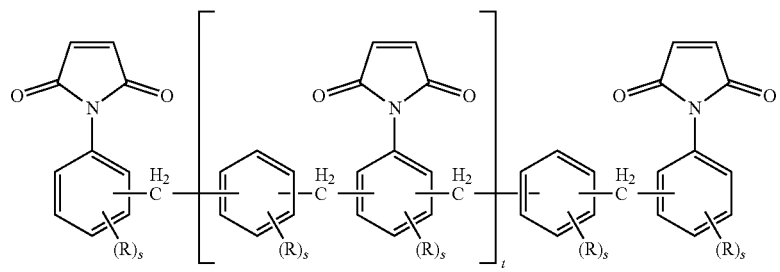

(iii)

in the formula, R is any of a hydrogen atom, an alkyl group, an aryl group, an aralkyl group, a halogen atom, a hydroxy group, and alkoxy group; s is an integer of 1 to 3; and t is an average of the repeating unit and is 0 to 10. Each of these may be used singly or two or more may be used in combination.

The active ester resins are not limited to particular resins; in general, preferably used are compounds having two or more ester groups with high reaction activity in one molecule such as phenol esters, thiophenol esters, N-hydroxyamine esters, and esters of heterocyclic hydroxy compounds. The active ester resins are preferably ones obtained by a condensation reaction between carboxylic acid compounds and/or thiocarboxylic acid compounds and hydroxy compounds and/or thiol compounds. From the viewpoint of improving heat resistance in particular, preferred are active ester resins obtained from carboxylic acid compounds or halides thereof and hydroxy compounds, and more preferred are active ester resins obtained from carboxylic acid compounds or halides thereof and phenol compounds and/or naphthol compounds. Examples of the carboxylic acid compounds include benzoic acid, acetic acid, succinic acid, maleic acid, itaconic acid, phthalic acid, isophthalic acid, terephthalic acid, pyromellitic acid, and halides thereof. Examples of the phenol compounds or naphthol compounds include hydroquinone, resorcinol, bisphenol A, bisphenol F, bisphenol S, dihydroxydiphenyl ether, phenolphthalein, methylated bisphenol A, methylated bisphenol F, methylated bisphenol S, phenol, o-cresol, m-cresol, p-cresol, catechol, α-naphthol, β-naphthol, 1,5-dihydroxynaphthalene, 1,6-dihydroxynaphthalene, 2,6-dihydroxynaphthalene, dihydroxybenzophenone, trihydroxybenzophenone tetrahydroxybenzophenone, phloroglucine, benzene triol, and dicyclopentadiene-phenol addition type resins.

Preferred examples of the active ester resins specifically include active ester-based resins containing a dicyclopentadiene-phenol addition structure, active ester resins containing a naphthalene structure, active ester resins that are acetylated phenol novolac, and active ester resins that are benzoylated phenol novolac; among them, more preferred are active ester resins containing a dicyclopentadiene-phenol addition structure and active ester resins containing a naphthalene structure in that they excel in improving peel strength. More specific examples of the active ester resins containing a dicyclopentadiene-phenol addition structure include a compound represented by General Formula (iv) below.

Furthermore, various types of novolac resins, addition polymerized resins of alicyclic diene compounds such as dicyclopentadiene and phenol compounds, modified novolac resins of phenolic hydroxy group-containing compounds and alkoxy group-containing aromatic compounds, phenol aralkyl resins (Zylock resin), naphthol aralkyl resins, trimethylolmethane resins, tetraphenylol ethane resins, biphenyl-modified phenolic resins, biphenyl-modified naphthol resins, aminotriazine-modified phenolic resins, and various types of vinyl polymers may be used in combination.

More specific examples of the various types of novolac resins include polymers obtained by reacting phenolic hydroxy group-containing compounds such as phenol, phenylphenol, resorcinol, biphenyl, bisphenols such as bisphenol A and bisphenol F, naphthol, and dihydroxynaphthalene and aldehyde compounds under acid-catalyzed conditions.

Examples of the various types of vinyl polymers include homopolymers of vinyl compounds such as polyhydroxystyrene, polystyrene, polyvinylnaphthalene, polyvinylanthracene, polyvinylcarbazole, polyindene, polyacenaphthylene, polynorbornene, polycyclodecene, polytetracyclododecene, polynortricyclene, and poly(meth)acrylate and copolymers of these compounds.

When these other resins are used, the blending ratio thereof, which can be set as desired according to applications, is preferably a ratio of 0.5 to 100 parts by mass of the other resins with respect to 100 parts by mass of the phenolic resin or the epoxy resin of the present invention because the balance effect of the flowability as a composition and a molding shrinkage rate during heating and curing produced by the present invention is exhibited more prominently.

A curing accelerator may be used in combination with the curable resin composition of the present invention. Examples of the curing accelerator include tertiary amine compounds such as imidazole and dimethylaminopyridine; phosphorus-based compounds such as triphenylphosphine; boron trifluoride amine complexes such as boron trifluoride and boron trifluoride monoethylamine complexes; organic acid compounds such as thiodipropionic acid; benzoxazine compounds such as thiodiphenol benzoxazine and sulfonylbenzoxazine; and sulfonyl compounds. Each of these may be used singly or two or more may be used in combination. The addition amount of these catalysts is preferably in the range of 0.001 to 15 parts by mass in 100 parts by mass of the curable resin composition.

In the case of use for applications in which high fire retardance is required for the curable resin composition of

[Chemical Formula 8]

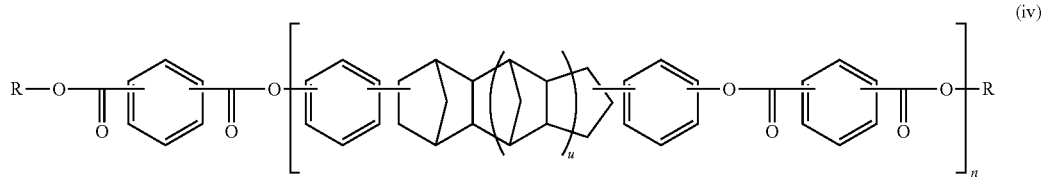

(iv)

in Formula (iv), R is a phenyl group or a naphthyl group; u represents 0 or 1; and n is an average of the repeating unit and is 0.05 to 2.5. From the viewpoint of lowering the dielectric loss tangent of the cured product of the resin composition and improving the heat resistance thereof, R is preferably a naphthyl group, u is preferably 0, and n is preferably 0.25 to 1.5.

the present invention, it may be blended with non-halogenated fire retardants, which do not substantially contain halogen atoms.

Examples of the non-halogenated fire retardants include phosphorus-based fire retardants, nitrogen-based fire retardants, silicone-based fire retardants, inorganic fire retardants, organometallic salt-based fire retardants; their use is not limited to particular use, and they may be used singly, a plurality of fire retardants of the same system may be used, or fire retardants of different systems can be used in combination.

As the phosphorous-based fire retardants, both inorganic and organic ones can be used. Examples of the inorganic compounds include red phosphorus, ammonium phosphates such as monoammonium phosphate, diammonium phosphate, triammonium phosphate, and ammonium polyphosphate, and inorganic nitrogen-containing phosphorus compounds such as phosphoric acid amides.

It is preferable that the red phosphorus is subjected to surface treatment to prevent hydrolysis and the like; examples of the method of surface treatment include (i) a method of performing coating treatment with an inorganic compound such as magnesium hydroxide, aluminum hydroxide, zinc hydroxide, titanium hydroxide, bismuth oxide, bismuth hydroxide, bismuth nitrate, or a mixture of these (ii) a method of performing coating treatment with a mixture of an inorganic compound such as magnesium hydroxide, aluminum hydroxide, zinc hydroxide, or titanium hydroxide and a thermosetting resin such as a phenolic resin, and (iii) a method of performing double coating treatment with a thermosetting resin such as a phenolic resin on a coating of an inorganic compound such as magnesium hydroxide, aluminum hydroxide, zinc hydroxide, or titanium hydroxide.

Examples of the organic phosphorus-based compounds include general-purpose organic phosphorus-based compounds such as phosphate compounds, phosphonic acid compounds, phosphinic acid compounds, phosphine oxide compounds, phosphorane compounds, and organic nitrogen-containing phosphorus compounds, cyclic organophosphorus compounds such as 9,10-dihydro-9-oxa-10-phosphaphenanthrene-10-oxide, 10-(2,5-dihydroxyphenyl)-10H-9-oxa-10-phosphaphenanthrene-10-oxide, and 10-(2,7-dihydrooxynaphthyl)-10H-9-oxa-10-phosphaphenanthrene-10-oxide, and derivatives obtained by reacting them with compounds such as epoxy resins and phenolic resins.

The blending amount of these phosphorus-based fire retardants is selected as appropriate depending on the type of the phosphorus-based fire retardants, the other components of the resin composition, and a desired degree of fire retardance; for example, in 100 parts by mass of the resin composition blended with all of the non-halogenated fire retardant and other fillers, additives, and the like, when red phosphorus is used as the non-halogenated fire retardant, blending in the range of 0.1 part by mass to 2.0 parts by mass is preferred, and when the organic phosphorous compound is used, blending in the range of 0.1 part by mass to 10.0 parts by mass is similarly preferred, and blending in the range of 0.5 part by mass to 6.0 parts by mass is more preferred.

When using the phosphorus-based fire retardants, hydrotalcite, magnesium hydroxide, boron compounds, zirconium oxide, black dye, calcium carbonate, zeolite, zinc molybdate, activated carbon, or the like may be used in combination with the phosphorus-based fire retardants.

Examples of the nitrogen-based fire retardants include triazine compounds, cyanuric acid compounds, isocyanuric acid compounds, and phenothiazines, with triazine compounds, cyanuric acid compounds, and isocyanuric acid compounds being preferred.

Examples of the triazine compounds include melamine, acetoguanamine, benzoguanamine, melon, melam, succinoguanamine, ethylene dimelamine, melamine polyphosphate, and triguanamine, (1) aminotriazine sulfate compounds such as guanylmelamine sulfate, melem sulfate, and melam sulfate, (2) co-condensation products of phenols such as phenol, cresol, xylenol, butylphenol, and nonylphenol, melamines such as melamine, benzoguanamine, acetoguanamine, and formguanamine, and formaldehyde, (3) mixtures of (2) the co-condensation products and phenolic resins such as phenol formaldehyde condensate, and (4) (2) and (3) further modified with paulownia oil, isomerized linseed oil, or the like.

Examples of the cyanuric acid compounds include cyanuric acid and melamine cyanurate.

The blending amount of the nitrogen-based fire retardants is selected as appropriate depending on the type of the nitrogen-based fire retardants, the other components of the resin composition, and a desired degree of fire resistance; for example, in 100 parts by mass of the resin composition blended with all of the non-halogenated fire retardant and other fillers, additives, and the like, blending in the range of 0.05 to 10 parts by mass is preferred, and blending in the range of 0.1 part by mass to 5 parts by mass is more preferred.

When using the nitrogen-based fire retardants, metal hydroxides, molybdenum compounds, or the like may be used in combination.

The silicone-based fire retardants can be used without any particular limitations so long as they are organic compounds containing silicon atoms; examples thereof include silicone oils, silicone rubbers, and silicone resins. The blending amount of the silicone-based fire retardants is selected as appropriate depending on the type of the silicone-based fire retardants, the other components of the resin composition, and a desired degree of fire resistance; for example, in 100 parts by mass of the resin composition blended with all of the non-halogenated fire retardant and other fillers, additives, and the like, blending in the range of 0.05 to 20 parts by mass is preferred. When using the silicone-based fire retardants, molybdenum compounds, alumina, or the like may be used in combination.

Examples of the inorganic fire retardants include metal hydroxides, metal oxides, metal carbonate compounds, metal powders, boron compounds, and low melting point glasses.

Examples of the metal hydroxides include aluminum hydroxide, magnesium hydroxide, dolomite, hydrotalcite, calcium hydroxide, barium hydroxide, and zirconium hydroxide.

Examples of the metal oxides include zinc molybdate, molybdenum trioxide, zinc tin oxide, tin oxide, aluminum oxide, iron oxide, titanium oxide, manganese oxide, zirconium oxide, zinc oxide, molybdenum oxide, cobalt oxide, bismuth oxide, chromium oxide, nickel oxide, copper oxide, and tungsten oxide.

Examples of the metal carbonate compounds include zinc carbonate, magnesium carbonate, calcium carbonate, barium carbonate, basic magnesium carbonate, aluminum carbonate, iron carbonate, cobalt carbonate, and titanium carbonate.

Examples of the metal powders include aluminum, iron, titanium, manganese, zinc, molybdenum, cobalt, bismuth, chromium, nickel, copper, tungsten, and tin.

Examples of the boron compounds include zinc borate, zinc metaborate, barium metaborate, boric acid, and borax.

Examples of the low melting point glasses include Ceepree (Bokusui Brown Co., Ltd.), hydrated glass $SiO_2$—$MgO$—$H_2O$, and glassy compounds such as $PbO$—$B_2O_3$-based, $ZnO$—$P_2O_5$—$MgO$-based, $P_2O_5$—$B_2O_3$—$PbO$—

MgO-based, P—Sn—O—F-based, PbO—V$_2$O$_5$—TeO$_2$-based, Al$_2$O$_3$—H$_2$O-based, and lead borosilicate-based ones.

The blending amount of the inorganic fire retardants is selected as appropriate depending on the type of the inorganic fire retardants, the other components of the resin composition, and a desired degree of fire resistance; for example, in 100 parts by mass of the resin composition blended with all of the non-halogenated fire retardant and other fillers, additives, and the like, blending in the range of 0.05 part by mass to 20 parts by mass is preferred, and blending in the range of 0.5 part by mass to 15 parts by mass is more preferred.

Examples of the organometallic salt-based fire retardants include ferrocene, acetylacetonate metal complexes, organometallic carbonyl compounds, organocobalt salt compounds, organometallic sulfonates, and compounds in which metal atoms and aromatic compounds or heterocyclic compounds are ionically bonded or coordinately bonded together.

The blending amount of the organometallic salt-based fire retardants is selected as appropriate depending on the type of the organometallic salt-based fire retardants, the other components of the resin composition, and a desired degree of fire resistance; for example, in 100 parts by mass of the resin composition blended with all of the non-halogenated fire retardant and other fillers, additives, and the like, blending in the range of 0.005 part by mass to 10 parts by mass is preferred.

The curable resin composition of the present invention can be blended with inorganic fillers as needed. Examples of the inorganic fillers include fused silica, crystalline silica, alumina, silicon nitride, and aluminum hydroxide. When the blending amount of the inorganic fillers is particularly increased, it is preferable to use fused silica. The fused silica can be used either in a crushed or spherical form; it is preferable to mainly use a spherical one in order to increase the blending amount of the fused silica and to inhibit an increase in the melt viscosity of a molding material. To further increase the blending amount of the spherical silica, it is preferable to appropriately adjust the particle size distribution of the spherical silica. Its filling rate is preferably higher in consideration of fire retardance and is particularly preferably 20% by mass or more with respect to the total mass of the curable resin composition. When used for applications such as conductive pastes, conductive fillers such as silver powder and copper powder can be used.

In addition to the above, various compounding agents such as silane coupling agents, mold release agents, pigments, and emulsifiers can be added to the curable resin composition of the present invention as needed.

<Applications of Curable Resin Composition>

The curable resin composition of the present invention can be used for semiconductor sealing materials, semiconductor devices, prepregs, printed circuit boards, build-up boards, build-up films, fiber-reinforced composite materials, fiber-reinforced resin molded articles, conductive pastes, and the like.

1. Semiconductor Sealing Material

Examples of the method for obtaining a semiconductor sealing material from the curable resin composition of the present invention include a method of sufficiently melting and mixing the curable resin composition and compounding agents such as inorganic fillers using an extruder, a kneader, rolls, or the like as needed until uniformity is achieved. In this process, fused silica is usually used as the inorganic fillers; when the semiconductor sealing material is used as a highly thermally conductive semiconductor sealing material for power transistors and power ICs, it is recommended to make crystalline silica, alumina, silicon nitride, or the like, which is higher than fused silica in thermal conductivity, highly filled or to use fused silica, crystalline silica, alumina, silicon nitride, or the like. As to the filling rate, it is preferable to use the inorganic fillers in the range of 30 parts by mass to 95 parts by mass per 100 parts by mass of the curable resin composition, and it is more preferably 70 parts by mass or more and is even more preferably 80 parts by mass or more in order to improve fire retardance, moisture resistance, and solder crack resistance and to reduce the coefficient of linear expansion.

2. Semiconductor Device

Examples of the method for obtaining a semiconductor device from the curable resin composition of the present invention include a method of molding the semiconductor sealing material by casting or using a transfer molding machine, an injection molding machine, or the like and then heating it at 50 to 200° C. for 2 to 10 hours.

3. Prepreg

Examples of the method for obtaining a prepreg from the curable resin composition of the present invention include a method of obtaining it by impregnating the curable resin composition, which is made into varnish by blending an organic solvent, into a reinforcing base material (paper, glass cloth, glass nonwoven fabric, aramid paper, aramid cloth, glass mats, glass roving cloth, or the like) and then heating it at a heating temperature corresponding to the type of the used solvent, or preferably 50 to 170° C. The mass ratio of the resin composition and the reinforcing base material used in this process is not limited to a particular ratio; it is usually preferable to prepare the resin content in the prepreg to be 20% by mass to 60% by mass.

Examples of the organic solvent used in this process include methyl ethyl ketone, acetone, dimethylformamide, methyl isobutyl ketone, methoxypropanol, cyclohexanone, methyl cellosolve, ethyl diglycol acetate, and propylene glycol monomethyl ether acetate, and selection and an appropriate use amount thereof can be selected as appropriate depending on applications; when a printed circuit board is further produced from the prepreg as described below, for example, it is preferable to use a polar solvent with a boiling point of 160° C. or less such as methyl ethyl ketone, acetone, or dimethylformamide and it is preferable to use it in a ratio giving a non-volatile content of 40% by mass to 80% by mass.

4. Printed Circuit Board

Examples of the method for obtaining a printed circuit board from the curable resin composition of the present invention include a method of stacking the prepreg by a usual method, overlapping copper foil thereon as appropriate, and heating and pressure bonding them at 170 to 300° C. for 10 minutes to 3 hours under a pressure of 1 to 10 MPa.

5. Build-Up Board

Examples of the method for obtaining a build-up board from the curable resin composition of the present invention include a method of passing through Steps 1 to 3. At Step 1, first, the curable resin composition, in which rubber, filler, or the like is blended as appropriate, is applied onto a circuit board on which a circuit is formed using spray coating, curtain coating, or the like and is then cured. At Step 2, the circuit board onto which the curable resin composition has been applied is drilled with certain through hole portions or the like as needed, is then treated with a roughening agent, the surface of which is washed with hot water to form irregularities on the board, and is plated with metal such as copper. At Step 3, the operations at Steps 1 and 2 are sequentially repeated as desired to build up a resin insulating layer and a conductor layer with a certain circuit pattern alternately to form the build-up board. At the above step, the drilling of the through hole portions may be done after the formation of the outermost resin insulating layer. As to the build-up board of the present invention, by heating and pressure bonding copper foil with resin, in which the resin composition is semi-cured on the copper foil, onto a circuit-formed wiring board at 170 to 300° C., the build-up board can be produced with the step of forming the roughened surface and the plating treatment omitted.

6. Build-Up Film

Examples of the method for obtaining a build-up film from the curable resin composition of the present invention include a method of applying the curable resin composition onto a support film and then drying it to form a resin composition layer on the support film. When the curable resin composition of the present invention is used for the build-up film, it is important for the film to soften under a temperature condition of lamination in the vacuum lamination method (usually 70° C. to 140° C.) and to exhibit fluidity (resin flow) that enables resin filling in via holes or through holes present in a circuit board at the same time as the circuit board is laminated; it is preferable to blend the above components so as to exhibit such characteristics.

The diameter of the through holes in the circuit board is usually 0.1 to 0.5 mm, and the depth thereof is usually 0.1 to 1.2 mm; it is usually preferable to enable resin filling in this range. When both sides of the circuit board are laminated, it is desirable to fill about ½ of the through holes.

Examples of a specific method for producing the build-up film described above include a method of preparing a resin composition blended with an organic solvent to be made into varnish, then applying the composition onto the surface of a support film, and further drying the organic solvent by heating, blowing hot air, or the like to form a layer of the resin composition.

Preferred examples of the organic solvent used in this process include ketones such as acetone, methyl ethyl ketone, and cyclohexanone; acetates such as ethyl acetate, butyl acetate, cellosolve acetate, propylene glycol monomethyl ether acetate, and carbitol acetate; carbitols such as cellosolve and butyl carbitol; aromatic hydrocarbons such as toluene and xylene; and dimethylformamide, dimethylacetamide, and N-methylpyrrolidone; it is preferable to use it in a ratio giving a non-volatile content of 30% by mass to 60% by mass.

The thickness of the layer of the resin composition to be formed usually needs to be not less than the thickness of a conductor layer. The thickness of the conductor layer of the circuit board is usually in the range of 5 to 70 µm, and thus it is preferable that the thickness of the resin composition layer has a thickness of 10 to 100 µm. The layer of the resin composition in the present invention may be protected with a protective film described below. By protecting it with the protective film, it is possible to prevent dust and the like from adhering to the surface of the resin composition layer and scratches therein.

Examples of the support film and the protective film described above include polyolefins such as polyethylene, polypropylene, and polyvinyl chloride, polyesters such as polyethylene terephthalate (hereinafter, may be abbreviated as "PET"), and polyethylene naphthalate, polycarbonate, polyimide, release paper, and metal foils such as copper foil and aluminum foil. The support film and the protective film may be subjected to mud treatment, corona treatment, or mold release treatment. The thickness of the support film, which is not limited to a particular thickness, is used usually in the range of 10 to 150 µm and preferably 25 to 50 µm. The thickness of the protective film is preferably 1 to 40 µm.

The support film described above is peeled off after being laminated to the circuit board or after forming an insulating layer by heating and curing. If the support film is peeled off after the resin composition layer forming the build-up film has been heated and cured, adhesion of dust and the like during a curing step can be prevented. When peeled off after curing, the support film is usually subjected to mold release treatment beforehand.

A multilayer printed circuit board can be produced from the build-up film obtained as described above. For example, if the layer of the resin composition is protected with the protective film, it is peeled off, and then the layer of the resin composition is laminated to one or both sides of the circuit board so as to make direct contact with the circuit board by the vacuum lamination method, for example. The method of lamination may be of a batch type or be of a continuous type with rolls. If necessary, the build-up film and the circuit board may be heated (pre-heated) before performing lamination, if necessary. As the laminating conditions, the pressure bonding temperature (laminating temperature) is preferably 70 to 140° C., the pressure bonding pressure is preferably 1 to 11 kgf/cm² ($9.8 \times 10^4$ to $107.9 \times 10^4$ N/m²), and it is preferable to perform lamination with air pressure under reduced pressure of 20 mmHg (26.7 hPa) or less.

7. Fiber-Reinforced Composite Material

Examples of the method for obtaining a fiber-reinforced composite material (a sheet-like intermediate material in which resin is impregnated into reinforcing fibers) from the resin composition of the present invention include a method of production by uniformly mixing the components forming the resin composition together to prepare varnish, then impregnating this into a reinforcing base material containing reinforcing fibers, and causing a polymerization reaction.

The curing temperature when performing such a polymerization reaction is specifically preferably in the temperature range of 50 to 250° C.; in particular, it is preferable to cure it at 50 to 100° C. to make a tack-free cured product and to further treat it under a temperature condition of 120 to 200° C.

The reinforcing fibers may be any of twisted yarn, untwisted yarn, and non-twisted yarn; untwisted yarn and non-twisted yarn are preferred because they achieve both the moldability and the mechanical strength of fiber-reinforced plastic members. Furthermore, as to the form of the reinforcing fibers, fibers in which fiber directions are aligned in one direction or woven fabric can be used. Woven fabric can be selected from plain weave, satin weave, and the like depending on parts in which it is used and applications. Specific examples thereof include carbon fiber, glass fiber, aramid fiber, boron fiber, alumina fiber, silicon carbide fiber because of their excellence in mechanical strength and durability; two or more of these can be used in combination. Among these, carbon fiber is preferred because of its favorable strength in molded articles in particular, and for the carbon fiber, various types of ones such as polyacrylonitrile-based, pitch-based, and rayon-based ones can be used. Among them, polyacrylonitrile-based one, which can easily produce high-strength carbon fiber, is preferred. The use amount of the reinforcing fibers when the varnish is impregnated into the reinforcing base material made of the reinforcing fibers to make the fiber-reinforced composite material is preferably an amount giving a volume content of the reinforcing fibers in the fiber-reinforced composite material in the range of 40% to 85%.

8. Fiber-Reinforced Resin Molded Article

Examples of the method for obtaining a fiber-reinforced molded article (a molded article in which a sheet-like member in which resin is impregnated into reinforcing fibers is cured) from the resin composition of the present invention include the hand layup method and the spray up method, in which fiber aggregate is laid in a mold, and the varnish is stacked in a multilayered manner, the vacuum bag method, in which using either a male mold or a female mold, a base material made of reinforced fibers is stacked while impregnating varnishes and molded, a flexible mold that can exert pressure on a molded product is overlaid and hermetically sealed, which is molded in vacuum (under reduced pressure), the SMC press method, in which varnish containing reinforcing fibers made into a sheet form in advance is compressed and molded in a mold, and a method of producing a prepreg in which the varnish is injected into reinforcing fibers by the RTM method, in which the varnish is injected into a combined mold laid with fibers, or the like and baking and hardening the prepreg with a large autoclave. The fiber-reinforced resin molded article obtained in the above is a molded article having the reinforcing fibers and a cured product of the resin composition, and specifically, the amount of the reinforcing fibers in the fiber-reinforced molded article is preferably in the range of 40% by mass to 70% by mass and is particularly preferably in the range of 50% by mass to 70% by mass in terms of strength.

9. Conductive Paste

Examples of the method for obtaining a conductive paste from the resin composition of the present invention include a method of dispersing fine conductive particles into the curable resin composition. The conductive paste can be a paste resin composition for circuit connection or an anisotropic conductive adhesive depending on the type of the used fine conductive particles.

EXAMPLES

The following describes the present invention more specifically with reference to examples and comparative examples; "parts" and "%" in the following are on a mass basis unless otherwise specified. Gel permeation chromatography (GPC), $^{13}$C-nuclear magnetic resonance (NMR), and mass spectrometry (MS) were measured under the following conditions.

<GPC Measurement Conditions>
Measurement apparatus: "HLC-8320 GPC" manufactured by Tosoh Corporation
Column: guard column "HXL-L" manufactured by Tosoh Corporation
  "TSK-GEL G2000HXL" manufactured by Tosoh Corporation
  "TSK-GEL G2000HXL" manufactured by Tosoh Corporation
  "TSK-GEL G3000HXL" manufactured by Tosoh Corporation
  "TSK-GEL G4000HXL" manufactured by Tosoh Corporation
  Detector: a differential refractometer (RI)
Data processing: "GPC Workstation EcoSEC-WorkStation" manufactured by Tosoh Corporation
Measurement conditions: column temperature 40° C.
development solvent tetrahydrofuran
flow rate 1.0 ml/minute Standard: the following monodisperse polystyrenes of known molecular weights were used in conformity to the measurement manual of "GPC Workstation EcoSEC-WorkStation" described above.

(Polystyrenes Used)
"A-500" manufactured by Tosoh Corporation
"A-1000" manufactured by Tosoh Corporation
"A-2500" manufactured by Tosoh Corporation
"A-5000" manufactured by Tosoh Corporation
"F-1" manufactured by Tosoh Corporation
"F-2" manufactured by Tosoh Corporation
"F-4" manufactured by Tosoh Corporation
"F-10" manufactured by Tosoh Corporation
"F-20" manufactured by Tosoh Corporation
"F-40" manufactured by Tosoh Corporation
"F-80" manufactured by Tosoh Corporation
"F-128" manufactured by Tosoh Corporation Sample: 1.0% by mass of a tetrahydrofuran solution in terms of resin solid content filtered through a microfilter (50 µl)

<Measurement Conditions of $^{13}$C-NMR>
Apparatus: ECA500 manufactured by JEOL Ltd.
Measurement mode: decoupling with reverse gate
Solvent: deuterated chloroform
Pulse angle: 30° pulse
Sample concentration: 30 wt %
Cumulative count: 2,000 times <Measurement Conditions of Field Desorption Mass Spectrometry (FD-MS) Spectrum>
The measurement was performed using a time-of-flight mass spectrometer JMS-T100GC manufactured by JEOL Ltd.

<Hydroxy Group Equivalent>
The measurement was performed based on JIS K0070.

<Softening Point>
The measurement was performed based on JIS K7234.

<Melt Viscosity>
The measurement was performed with an ICI viscometer in conformity to ASTM D4287.

<Epoxy Equivalent>
The measurement was performed based on JIS K7236.

Example 1: Synthesis of Polyfunctional Phenolic Resin (a-1)

Into a 2-L flask equipped with a thermometer, a cooling tube, a Dean-Stark trap, and a stirrer, 216.2 g (1.50 mol) of β-naphthol, 412.9 g (3.75 mol) of catechol, and 4.1 g of distilled water were charged, and the temperature was raised up to 150° C. while dissolving the solid content. While maintaining that temperature, 140.4 g (1.73 mol) of 37% formalin was added dropwise thereto over 3 hours. Furthermore, the reaction was performed at 150° C. for 6 hours while expelling the distilled water to the outside of the system. After the reaction, unreacted catechol was distilled off while blowing in water vapor at 150° C. under reduced pressure to obtain 325.9 g of a polyfunctional phenol resin (a-1) of the present invention. The hydroxy group equivalent of the polyfunctional phenolic resin (a-1) was 92 g/eq, the softening point thereof was 94° C., and the melt viscosity at 150° C. thereof was 5.6 dPa·s.

Example 2: Synthesis of Polyfunctional Phenolic Resin (a-2)

Into a 2-L flask equipped with a thermometer, a cooling tube, a Dean-Stark trap, and a stirrer, 216.2 g (1.50 mol) of β-naphthol, 330.3 g (3.00 mol) of catechol, and 6.6 g of distilled water were charged, and the temperature was raised up to 150° C. while dissolving the solid content. While maintaining that temperature, 140.4 g (1.73 mol) of 37% formalin was added dropwise thereto over 3 hours. Furthermore, the reaction was performed at 150° C. for 6 hours while expelling the distilled water to the outside of the system. After the reaction, unreacted catechol was distilled off while blowing in water vapor at 150° C. under reduced pressure to obtain 347.1 g of a polyfunctional phenol resin (a-2) of the present invention. The hydroxy group equivalent of the polyfunctional phenolic resin (a-2) was 93 g/eq, the softening point thereof was 101° C., and the melt viscosity at 150° C. thereof was 8.8 dPa·s.

Example 3: Synthesis of Polyfunctional Phenolic Resin (a-3)

Into a 2-L flask equipped with a thermometer, a cooling tube, a Dean-Stark trap, and a stirrer, 216.2 g (1.50 mol) of β-naphthol, 495.5 g (4.50 mol) of catechol, and 9.9 g of distilled water were charged, and the temperature was raised up to 150° C. while dissolving the solid content. While maintaining that temperature, 140.4 g (1.73 mol) of 37% formalin was added dropwise thereto over 3 hours. Furthermore, the reaction was performed at 150° C. for 6 hours while expelling the distilled water to the outside of the system. After the reaction, unreacted catechol was distilled off while blowing in water vapor at 150° C. under reduced pressure to obtain 346.6 g of a polyfunctional phenolic resin (a-3) of the present invention. The hydroxy group equivalent of the polyfunctional phenolic resin (a-3) was 93 g/eq, the softening point thereof was 91° C., and the melt viscosity at 150° C. thereof was 4.5 dPa·s.

Example 4: Synthesis of Polyfunctional Epoxy Resin (A-1)

Figure 2:
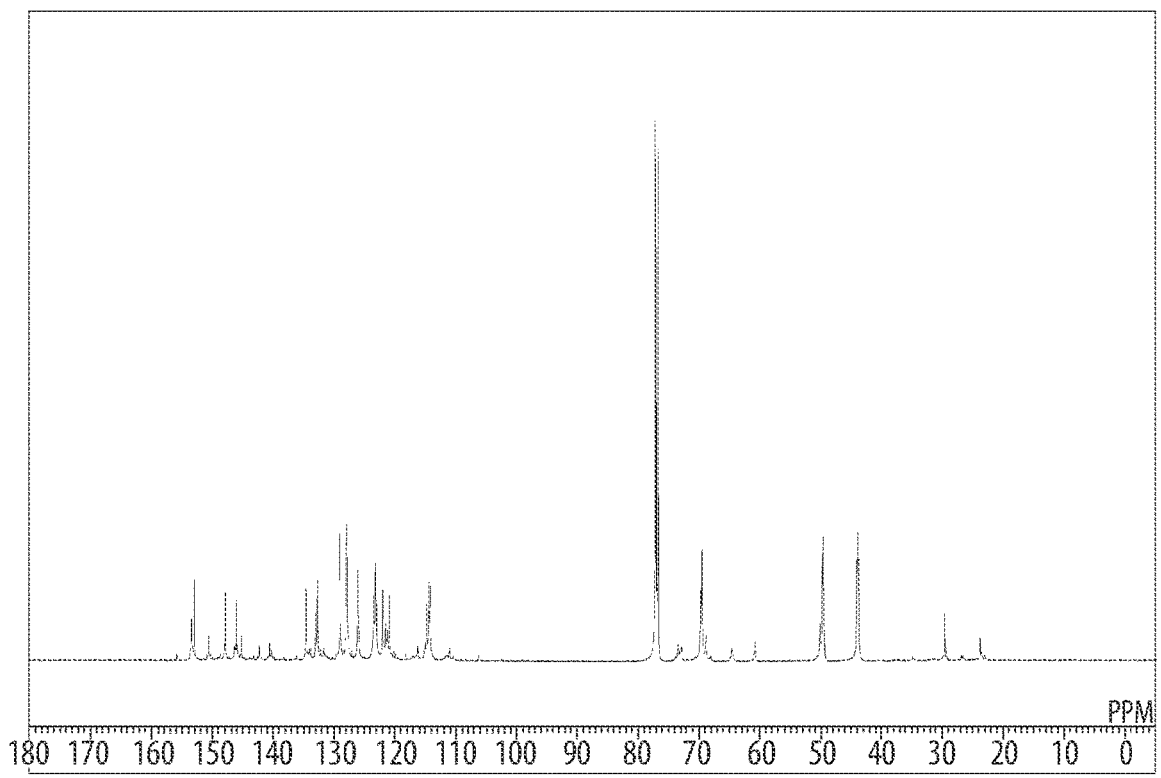
FIG. 2 is a $^{13}$C-nuclear magnetic resonance (NMR) spectrum of the polyfunctional epoxy resin (A-1) obtained in Example 4.
Figure 3:
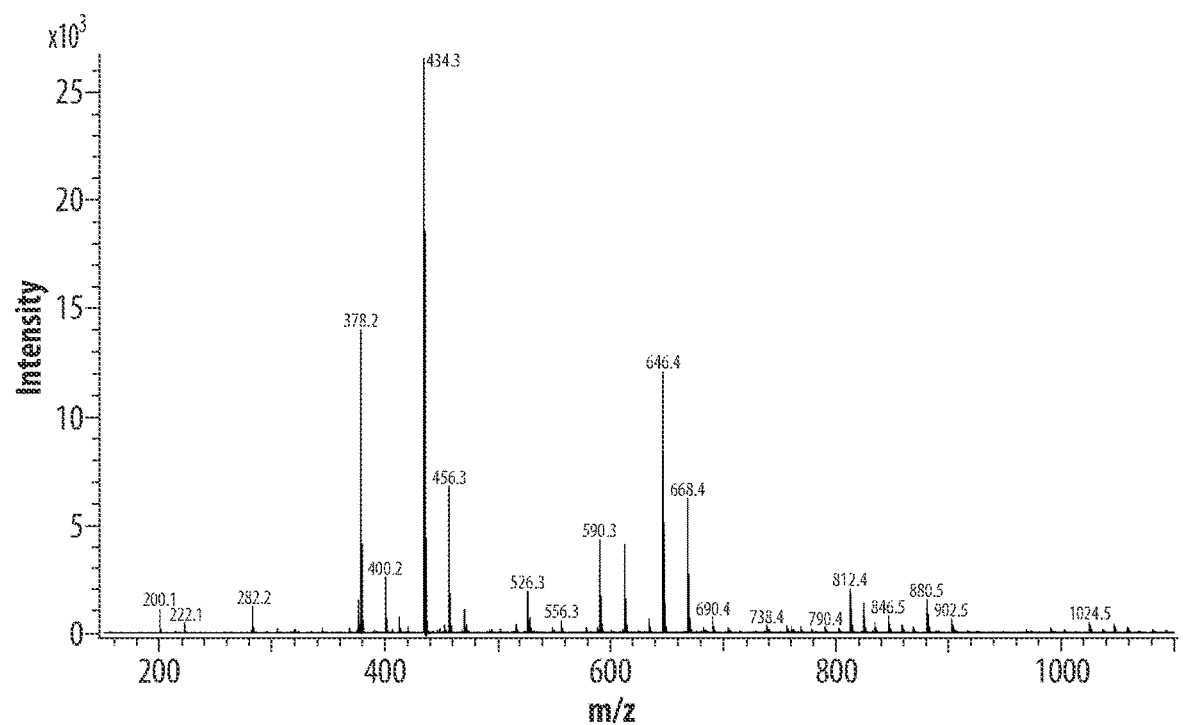
FIG. 3 is a field desorption mass spectrometry (FD-MS) spectrum of the polyfunctional epoxy resin (A-1) obtained in Example 4.

Into a 2-L flask equipped with a thermometer, a cooling tube, and a stirrer, 230.0 g (2.5 mol as the hydroxy group) of the polyfunctional phenol resin (a-1) and 925.0 g (10 mol) of epichlorohydrin were charged, and the temperature was raised up to 50° C. while dissolving the solid content with stirring. Then, 2.30 g of benzyltrimethylammonium chloride was charged thereinto, and the reaction was performed for 24 hours at a temperature of 50° C. as it was. In addition, 224.5 g of a 49% aqueous sodium hydroxide solution (1.10 equivalents with respect to 1 mole of the hydroxy group) was added dropwise thereto over 3 hours, and the reaction was further performed at 50° C. for 1 hour. After completion of the reaction, 185.0 g of n-butanol was added thereto, stirring was stopped, the aqueous layer accumulated in the lower layer was removed, stirring was resumed, and unreacted epichlorohydrin was distilled off at 150° C. under reduced pressure. To the thus obtained crude epoxy resin, 629.0 g of methyl isobutyl ketone and 105.0 g of n-butanol were added to dissolve it. Furthermore, 47.0 g of a 10% aqueous sodium hydroxide solution was added to the solution and was reacted at 80° C. for 2 hours, followed by repeated washing with 185.0 g of water until the pH of the washing solution became neutral. Then, the system was dehydrated by azeotropy, and after microfiltration, the solvent was distilled off under reduced pressure to obtain 358.9 g of a desired polyfunctional epoxy resin (A-1). The epoxy equivalent of the obtained epoxy resin (A-1) was 181 g/eq, and the melt viscosity at 150° C. thereof was 0.5 dPa·s. FIG. 1 illustrates a GPC chart of the epoxy resin (A-1), FIG. 2 illustrates a $^{13}$C-NMR spectrum thereof, and FIG. 3 illustrates an FD-MS spectrum thereof.

Example 5: Synthesis of Polyfunctional Epoxy Resin (A-2)

Figure 4:
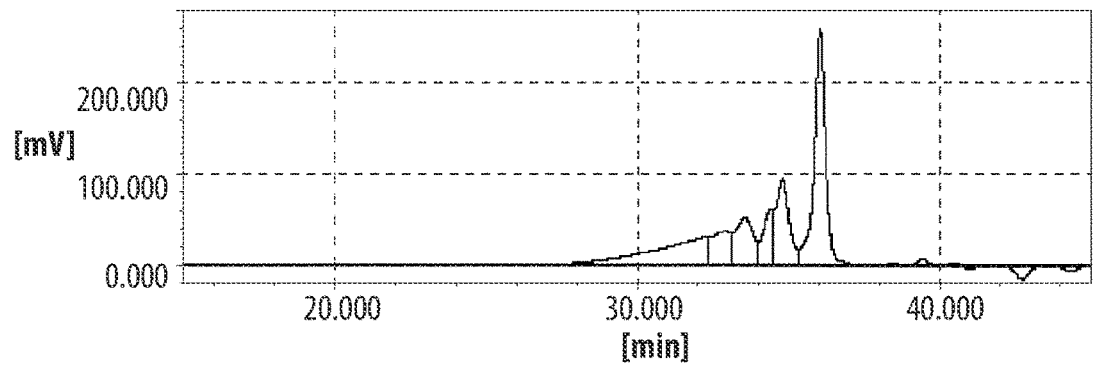
FIG. 4 is a GPC chart of a polyfunctional epoxy resin (A-2) obtained in Example 5.

The same operation as in Example 4 was performed except that 230.0 g of the polyfunctional phenolic resin (a-1) was changed to 232.5 g of the polyfunctional phenolic resin (a-2) to obtain 362.8 g of a polyfunctional epoxy resin (A-2). The epoxy equivalent of the obtained epoxy resin (A-2) was 192 g/eq, and the melt viscosity at 150° C. thereof was 0.9 dPa·s. FIG. 4 illustrates a GPC chart of the epoxy resin (A-2).

Example 6: Synthesis of Polyfunctional Epoxy Resin (A-3)

Figure 5:
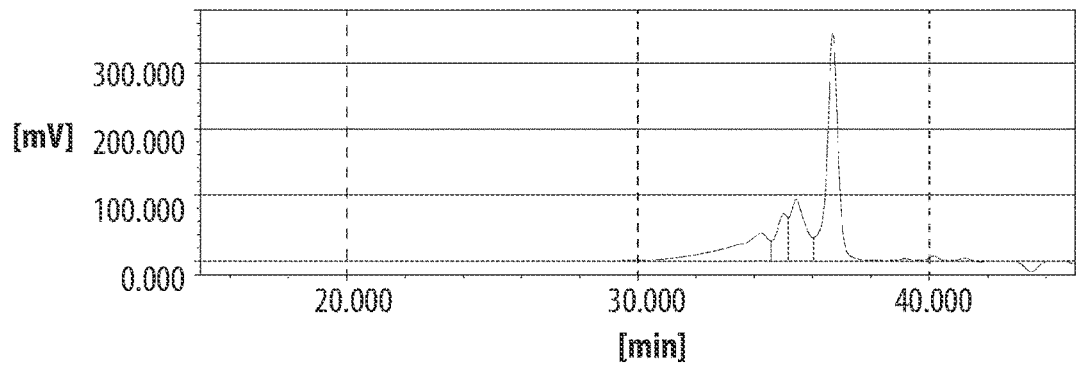
FIG. 5 is a GPC chart of a polyfunctional epoxy resin (A-3) obtained in Example 6.

The same operation as in Example 4 was performed except that 230.0 g of the polyfunctional phenolic resin (a-1) was changed to 232.5 g of the polyfunctional phenolic resin (a-3) to obtain 353.9 g of a polyfunctional epoxy resin (A-3). The epoxy equivalent of the obtained epoxy resin (A-3) was 181 g/eq, and the melt viscosity at 150° C. thereof was 0.4 dPa·s. FIG. 5 illustrates a GPC chart of the epoxy resin (A-3).

Synthesis Example 1

Into a 2-L flask equipped with a thermometer, cooling tube, and a stirrer, 165.0 g (1.5 mol) of catechol and 1,110 g (12 mol) of epichlorohydrin were charged, and the temperature was raised to 50° C. while dissolving the solid content with stirring. Then, 11.2 g of benzyltrimethylammonium chloride was charged thereinto, and the reaction was performed for 24 hours at a temperature of 50° C. as it was. Furthermore, 269.4 g of a 49% aqueous sodium hydroxide solution (1.10 equivalents with respect to 1 mole of the hydroxy group) was added dropwise thereto over 3 hours, and the reaction was further performed at 50° C. for 1 hour. After completion of the reaction, 222.0 g of n-butanol was added thereto, stirring was stopped, the aqueous layer accumulated in the lower layer was removed, stirring was resumed, and unreacted epichlorohydrin was distilled off at 150° C. under reduced pressure. To the thus obtained crude epoxy resin, 566.1 g of methyl isobutyl ketone and 94.5 g of n-butanol were added to dissolve it. Furthermore, 14.2 g of a 10% aqueous sodium hydroxide solution was added to the solution and was reacted at 80° C. for 2 hours, followed by repeated washing with 185.0 g of water until the pH of the washing solution became neutral. Then, the system was dehydrated by azeotropy, and after microfiltration, the solvent was distilled off under reduced pressure to obtain 323.0 g of a polyfunctional epoxy resin (B-1) for comparison. The epoxy equivalent of the obtained epoxy resin (B-1) was 139 g/eq, and the melt viscosity at 25° C. thereof was 190 mPa·s.

Naphthalene type epoxy resin Epiclon HP-4770 (epoxy equivalent: 204 g/eq, melt viscosity at 150° C.: 0.7 dPa·s) manufactured by DIC Corporation was used as it was as an epoxy resin (B-2) for comparison.

Examples 7 to 9 and Comparative Examples 1 to 2

The polyfunctional epoxy resins (A-1) to (A-3) obtained in Examples 4 to 6, the epoxy resins (B-1) and (B-2) for comparison, and 4,4'-diaminodiphenyl sulfone as a curing agent were blended so as to give an epoxy equivalent/active hydrogen equivalent=1/1 and were melted and mixed together at 120° C. to obtain curable resin compositions. Furthermore, each of the curable resin compositions was poured into the space between glass plates with 2-mm and 4-mm spacers held therebetween, and a curing reaction was performed at 150° C. for 1 hour followed by at 180° C. for 3 hours to produce a cured product.

<Glass Transition Temperature>

The cured product with a thickness of 2 mm was cut out to a size with a width of 5 mm and a length of 20 mm, which was used as a test piece. For this test piece, using a viscoelasticity measurement apparatus (DMA: solid-state viscoelasticity measurement apparatus "DMS6100" manufactured by Hitachi High-Tech Science Corporation, deformation mode:

both ends supported bending, measurement mode: sinusoidal vibration, frequency: 1 Hz, temperature rise rate: 3° C./minute), the temperature at which an elastic modulus change is the largest (the tan δ change rate is the largest) was evaluated as a glass transition temperature.

<Bending Strength, Bending Elastic Modulus, and Bending Strain>

The bending strength, the bending elastic modulus, and the bending strain of the cured product with a thickness of 4 mm were measured in accordance with JIS K7171.

in Structural Formula (1), R is a hydrogen atom, an alkyl group, or an aryl group; $R^1$ is a hydrogen atom or a methyl group; $R^2$ is a hydrogen atom or an alkyl group; n is an integer of 0 to 3; m is an integer of 0 to 6; l is an integer of 1 to 4; n+1 is 4; and a plurality of $R^1$ and $R^2$ are optionally same as or different from each other.

2. The polyfunctional phenolic resin according to claim 1, wherein R, $R^1$, and $R^2$ in Structural Formula (1) above are hydrogen atoms.

3. A curable resin composition comprising:
the polyfunctional phenolic resin according to claim 1; and
a curing agent (X).

4. A cured product of the curable resin composition according to claim 3.

5. A fiber-reinforced composite material comprising:
the curable resin composition according to claim 3; and
reinforcing fibers.

6. A fiber-reinforced molded article as a cured product of the fiber-reinforced composite material according to claim 5.

7. A semiconductor sealing material comprising:
the curable resin composition according to claim 3; and
an inorganic filler.

8. A semiconductor device comprising a cured product of the semiconductor sealing material according to claim 7.

TABLE 1

|  |  | Example 7 | Example 8 | Example 9 | Comparative Example 1 | Comparative Example 2 |
|---|---|---|---|---|---|---|
| A-1 | g | 100 | | | | |
| A-2 | g | | 100 | | | |
| A-3 | g | | | 100 | | |
| B-1 | g | | | | 100 | |
| B-2 | g | | | | | 100 |
| 4,4'-Diaminodiphenyl sulfone | g | 34.3 | 32.3 | 34.3 | 44.6 | 30.4 |
| Glass transition temperature Tg (DMA) | ° C. | 262 | 259 | 248 | 137 | 235 |
| Bending elastic modulus | MPa | 4,100 | 4,000 | 4,000 | 4,600 | 3,900 |
| Bending strength | MPa | 131 | 115 | 154 | 139 | 82 |
| Bending strain | % | 3.6 | 3.1 | 4.6 | 5.7 | 2.2 |

The invention claimed is:

1. A polyfunctional phenolic resin formed with a naphthol structure optionally having a substituent on an aromatic ring and a catechol structure optionally having a methyl group as a substituent on an aromatic ring bonded together via a methylene group optionally having a substituent;
wherein the polyfunctional phenolic resin is represented by Structural Formula (1) below:

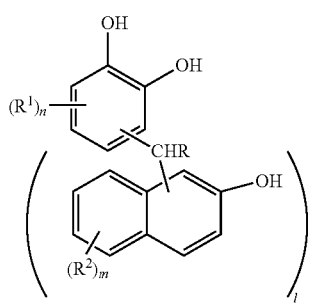

(1)

9. A prepreg as a semi-cured product of an impregnated base material comprising the curable resin composition according to claim 3 and a reinforcing base material.

10. A circuit board comprising:
a plate-shaped body of the curable resin composition according to claim 3; and
copper foil.

11. A build-up film comprising:
a cured product of the curable resin composition according to claim 3; and
a base film.

12. A polyfunctional epoxy resin as a reaction product of a polyfunctional phenolic compound formed with a naphthol structure optionally having a substituent on an aromatic ring and a catechol structure optionally having a methyl group as a substituent on an aromatic ring bonded together via a methylene group optionally having a substituent and epihalohydrin;
wherein the polyfunctional epoxy resin is represented by Structural Formula (2) below:

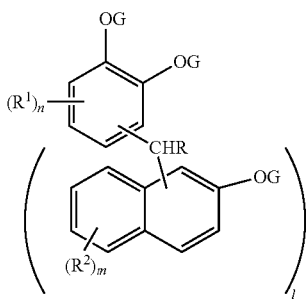

(2)

in Structural Formula (2), G is a glycidyl group; R is a hydrogen atom, an alkyl group, or an aryl group, $R^1$ is a hydrogen atom or a methyl group; $R^2$ is a hydrogen atom or an alkyl group; n is an integer of 0 to 3; m is an integer of 0 to 6; 1 is an integer of 1 to 4; n+1 is 4; and a plurality of $R^1$ and $R^2$ are optionally same as or different from each other.

13. The polyfunctional epoxy resin according to claim 12, wherein R, $R^1$ and $R^2$ in Structural Formula (2) above are hydrogen atoms.

14. A curable resin composition comprising:
the polyfunctional epoxy resin according to claim 12; and
a curing agent (Y).

15. A cured product of the curable resin composition according to claim 14.

16. A fiber-reinforced composite material comprising:
the curable resin composition according to claim 14; and
reinforcing fibers.

17. A semiconductor sealing material comprising:
the curable resin composition according to claim 14; and
an inorganic filler.

* * * * *